United States Patent [19]

Kandasamy et al.

[11] Patent Number: 5,640,584

[45] Date of Patent: Jun. 17, 1997

[54] VIRTUAL PROCESSOR METHOD AND APPARATUS FOR ENHANCING PARALLELISM AND AVAILABILITY IN COMPUTER SYSTEMS

[75] Inventors: David R. Kandasamy, San Ramon; John R. Catozzi, Redondo Beach, both of Calif.; Douglas W. Heying, Surrey, England

[73] Assignee: NCR Corporation, Dayton, Ohio

[21] Appl. No.: 353,590

[22] Filed: Dec. 12, 1994

[51] Int. Cl.⁶ ................ G06F 9/38; G06F 9/30; G06F 15/16
[52] U.S. Cl. ............ 395/800; 395/382; 395/391; 395/582; 395/200.19; 364/DIG. 1; 364/DIG. 2
[58] Field of Search ............... 395/700, 650, 395/725, 480, 200.01, 500, 800, 200.18, 737, 375, 506, 508, 672, 200.15, 733, 200.16, 676, 856, 674, 675, 735; 364/DIG. 1, DIG. 2

[56] References Cited

U.S. PATENT DOCUMENTS

| | | | |
|---|---|---|---|
| 4,500,960 | 2/1985 | Babecki et al. | 364/200 |
| 5,047,925 | 9/1991 | Kun et al. | 364/200 |
| 5,062,046 | 10/1991 | Sumiyoshi et al. | 364/200 |
| 5,101,346 | 3/1992 | Ohtsuki | 395/800 |
| 5,113,522 | 5/1992 | Dinwiddie, Jr. et al. | 395/700 |
| 5,129,077 | 7/1992 | Hillis | 395/500 |
| 5,193,202 | 3/1993 | Jackson et al. | 395/800 |
| 5,247,675 | 9/1993 | Farrell et al | 395/650 |
| 5,339,415 | 8/1994 | Strout, II et al. | 395/650 |
| 5,353,418 | 10/1994 | Nikhil et al. | 395/375 |
| 5,404,469 | 4/1995 | Chung et al. | 395/375 |
| 5,481,719 | 1/1996 | Ackerman et al. | 395/700 |

FOREIGN PATENT DOCUMENTS

| | | |
|---|---|---|
| 0602773 | 6/1994 | European Pat. Off. . |
| 2123455 | 5/1990 | Japan . |

OTHER PUBLICATIONS

Paul Austin et al., "The Design of an Operating System for a Scalable Computing Engine", Software-Practice & Experience, vol. 21, No. 10, Oct. 1991, pp. 989–1013.

Peter Steiner, "Extending Multiprogramming to a DMPP", Future Generations Computer Systems, vol. 8, No. 1/03, Jul. 1992, pp. 93–109.

*Primary Examiner*—Daniel H. Pan
*Attorney, Agent, or Firm*—George H. Gates

[57] ABSTRACT

A virtual processor method and apparatus for parallel computer systems that increases the level of parallelism to include multiple threads per node. If a processor node has a plurality of storage devices attached, a single thread can be allocated to each device. Similarly, if a processor node has multiple CPUs, each individual thread can utilize a different CPU. Thus, a task could potentially occupy all available hardware in the system. The result is increased system utilization and availability.

22 Claims, 4 Drawing Sheets

VIRTUAL PROCESSOR METHOD AND APPARATUS FOR ENHANCING PARALLELISM AND AVAILABILITY IN COMPUTER SYSTEMS

BACKGROUND OF THE INVENTION

1. Field of Invention

This invention relates in general to a parallel processing system, and in particular to virtual processors designed to allow multiple threads of work to execute concurrently with enhanced parallelism and availability.

2. Description of Related Art

Parallel processing systems are frequently comprised of an operating system and arrays of individual computers (i.e., processor nodes), each with their own central processing unit (CPU), memory, and data storage unit. Tasks are executed in parallel by utilizing each processor node.

During the execution of a task, a body of work is divided into multiple threads. A thread is a stream of instructions executed by the computer on behalf of a task. As an analogy, a task such as an orchestra performing a symphony can be decomposed into many threads which would be the individual musicians, each playing their part. Typically, in a parallel computer system, each thread is allocated to a different processor node. Each of these threads is then executed in parallel at their respective separate nodes. For instance, three threads can occupy and execute simultaneously on three different nodes at the same time. One of the advantages of this parallel processing technique is accelerated execution times. However, this technique should not be confused with the situation where one processor node executes a plurality of threads and the threads actually share or alternate slices of the processor node's total time.

Although the conventional form of parallel processing has merits, there are shortcomings. Conventional parallel processing techniques may result in an inefficient use of the available hardware. For example, if a processor node has multiple storage devices (i.e., disk drives) attached, then a single thread of execution might access only one of those devices at a time, leaving the other storage devices underutilized or even idle. In addition, if a parallel system is constructed out of multiprocessor nodes, then a single thread per node might not utilize all of the available CPUs in the node.

SUMMARY OF THE INVENTION

To overcome the limitations in the prior art described above, and to overcome other limitations that will become apparent upon reading and understanding the present specification, the present invention discloses a virtual processor method and apparatus for parallel computer systems that increases the level of parallelism to include multiple threads per node. If a processor node has a plurality of storage devices attached, a single thread can be allocated to each device so that multiple threads can execute simultaneously and not just alternate time slices. Similarly, if a processor node has multiple CPUs, each individual thread can simultaneously utilize a different CPU. Thus, a task could potentially occupy all available hardware in the system. The result is increased system utilization and availability.

In the current invention, each thread is encapsulated in an operating environment termed a Virtual Processor (vproc). The vproc provides the basic unit of parallelism. This vproc parallelism is independent of actual hardware parallelism. In addition, the vproc provides a level of isolation from other threads operating in other vprocs on the same or other nodes.

An object of the present invention is to provide more efficient usage of parallel computer systems. This object is achieved through use of the Virtual Processor (vproc) concept of the present invention, which adds a level of abstraction between the multi-threading of a particular task and the physical layout of the computing system. This feature provides the benefit of better control over the degree of parallelism. Another benefit is higher system availability without undue programming overhead in the application. Still another benefit of the present invention is its ability to provide enhanced fault tolerance.

BRIEF DESCRIPTION OF THE DRAWINGS

Referring now to the drawings in which like reference numbers represent the corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Parallel processing systems typically attempt to divide the execution of a particular task over an array of processing elements. The Virtual Processor (vproc) concept of the present invention adds a level of abstraction between the multi-threading of a particular task, and the physical layout of the computing system. The benefits derived are better control over the degree of parallelism, higher system availability without undue programming overhead in the application, and enhanced fault tolerance.

Figure 1:
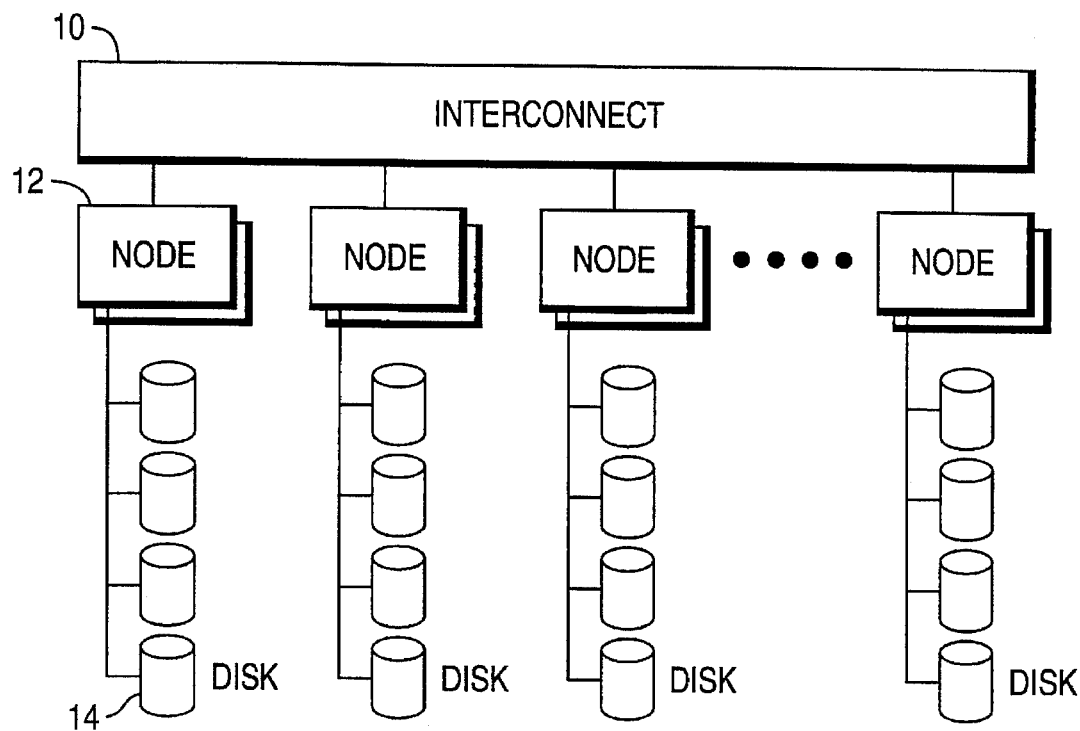
FIG. 1 is a diagram of a typical parallel processing system.

FIG. 1 shows a typical parallel processing system. An interconnect network 10 is the means by which the processor nodes 12 are grouped together and communicate with each other. Each node may have multiple storage devices 14. A processor node 12 may also have multiple CPUs used for tightly coupled or symmetric multiprocessing. In a typical parallel processing system, a task is divided into multiple threads of execution (or elements of work), usually with one thread per processor node 12. Each of these threads is then executed in parallel (concurrently) by the processor nodes 12. However, if a node 12 is constructed out of multiple CPUs, a single thread per node might not occupy all the CPUs.

Figure 2:
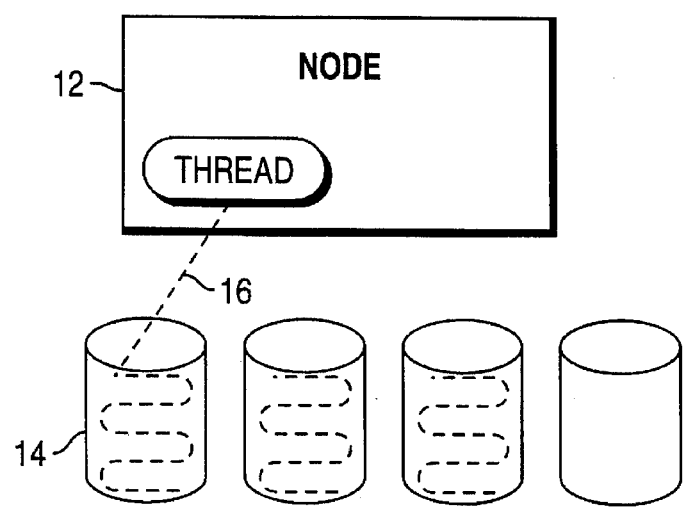
FIG. 2 is a representation of disk storage usage without vprocs.

FIG. 2 is a representation of a single node 12 without vprocs and with multiple storage devices attached 14. This figure illustrates that a single thread 16 of execution might access three devices 14 sequentially, but only one at a time, leaving the other available storage devices 14 idle.

Figure 3:
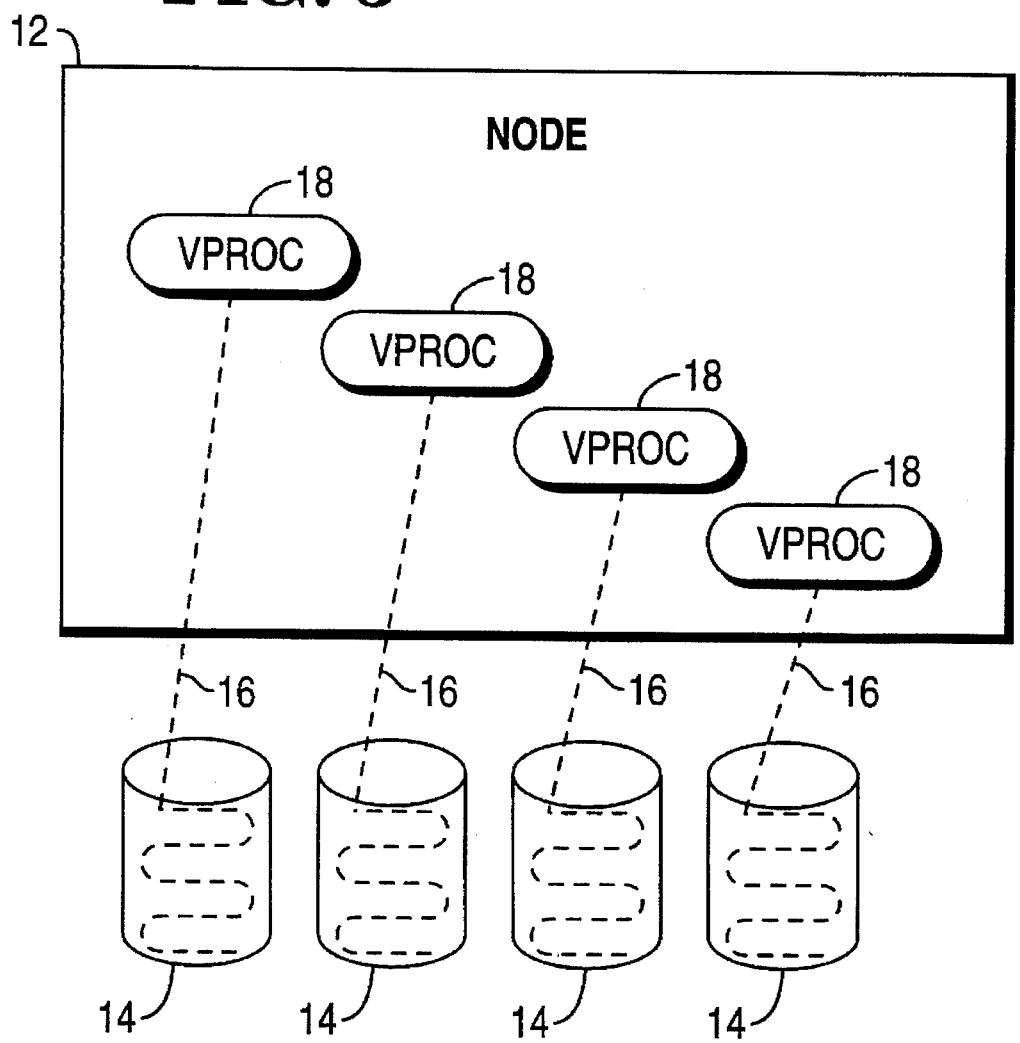
FIG. 3 is a representation of disk storage usage with vprocs.

FIG. 3 is a representation of a single node 12 with multiple threads 16 and multiple storage units 14. Each thread 16 is encapsulated in an operating environment termed a Virtual Processor (vproc) 18. Each vproc 18 is given its own private logical disk space, called a Virtual Disk (vdisk), which may actually be one or more data storage devices 14. Using the vproc concept, the degree of parallelism provided by the parallel system may be increased to include multiple concurrently executing threads 16 per node 12, so that there is one thread 16 per storage device 14, rather than one thread 16 per node 12 as shown in FIG. 2. The combination of vprocs 18 and vdisks allows the threads 16 to execute simultaneously and not just alternate time slices of the node 12. Similarly, if a processor node 12 has multiple CPUs, each individual thread 16 may utilize a different CPU for enhanced parallelism. The vproc 18 also provides a level of isolation from other threads 16 operating in other vprocs 18 on the same node 12. Moreover, the vprocs 18 provide a degree of location transparency, in that vprocs 18 communicate with each other using addresses that are vproc-specific, rather than processor-node-specific, i.e., a vproc 18 can be addressed without needing to know what node it's executing on and vprocs 18 on different nodes 12 talk to each other using the same mechanisms as vprocs on the same node 12. Further, vprocs 18 facilitate redundancy by providing a level of isolation/abstraction between the physical node 12 and the thread 16 of execution, thereby allowing all threads 16 to run even when some nodes 12 have failed or are shut down. The result is increased system utilization and fault tolerance.

Figure 4A:
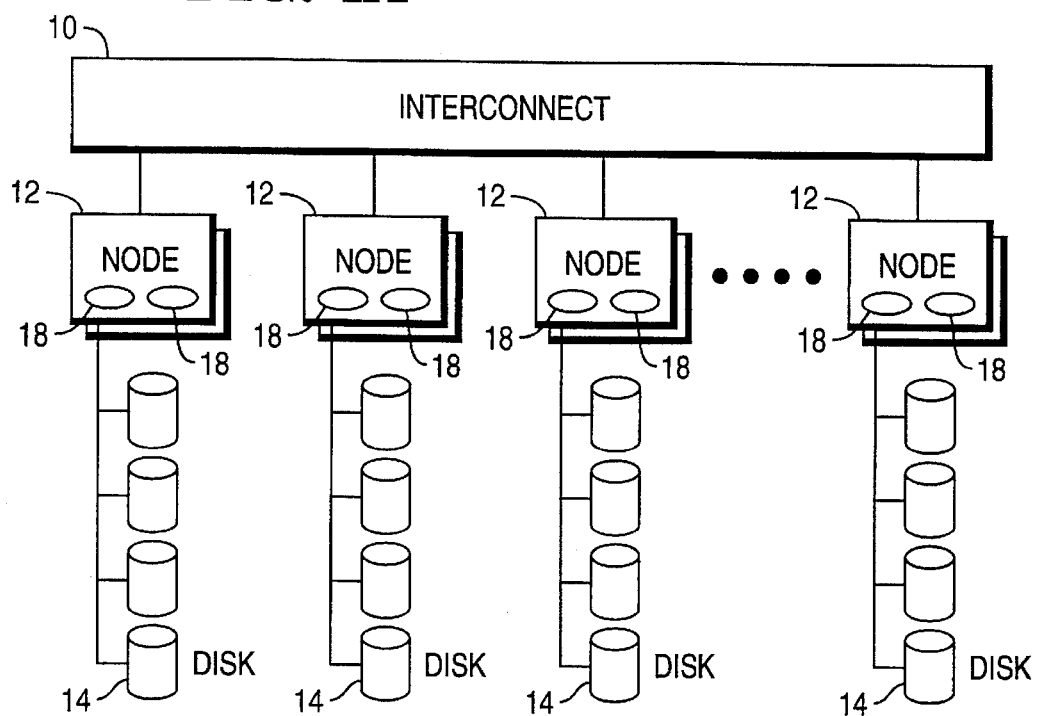
FIGS. 4a and 4b illustrate how vprocs communicate with each other using addresses that are vproc-specific.

FIG. 4a illustrates the level of system software at which the preferred embodiment of the vproc concept can be implemented. Traditional partitioning of computer systems has been done at a very low level, where address spaces are divided, and interrupts and other low-level CPU operations are partitioned and isolated. The present invention implements vprocs 18 at the operating system data structure level and in its interconnect 10 software. By providing "virtualism" at the data structure level, the partitioning and isolation of vprocs 18 can be provided at a much lower performance cost than traditional virtual machine implementations.

The operating system (OS) image in each node 12 keeps track of which vproc 18 each task belongs to. Whenever that task makes an operating system call to perform some function, the OS keeps track of addresses/tags/handles for the entity on a vproc 18 basis. In other words, the task will get back a mailbox with an address that is unique within that vproc 18. Other vprocs 18 operating on the same node 12 may also have that address, but since the OS keeps track of which tasks belong to which vproc 18, all those mailboxes are logically distinct.

The OS also assigns vprocs 18 to processor nodes 12 at system startup time, preferably based on a load-balancing algorithm, although other allocation algorithms may be used as well. In addition, the OS can re-assign vprocs 18 to processor nodes 12 whenever additional processor nodes 18 become available, i.e., after they have been repaired and/or rebooted. At system startup time, a translation table of vprocs 18 and the nodes 12 on which they reside is created and stored in an interconnect driver 10. The translation table of vprocs 18 and the nodes 12 on which they reside is updated whenever vprocs 18 are moved between nodes 12 for whatever reason.

When a message is sent to a mailbox in a particular vproc 18, the interconnect driver 10 looks up the vproc/node translation in the table, sends the message to the designated node 12, and the recipient node 12 then routes it locally to the appropriate mailbox in the proper vproc 18. Thus, vprocs 18 communicate with each other using addresses that are vproc-specific rather than node-specific. Specifically, a vproc 18 can be addressed without knowing what processor node 12 it is executing on.

Figure 4B:
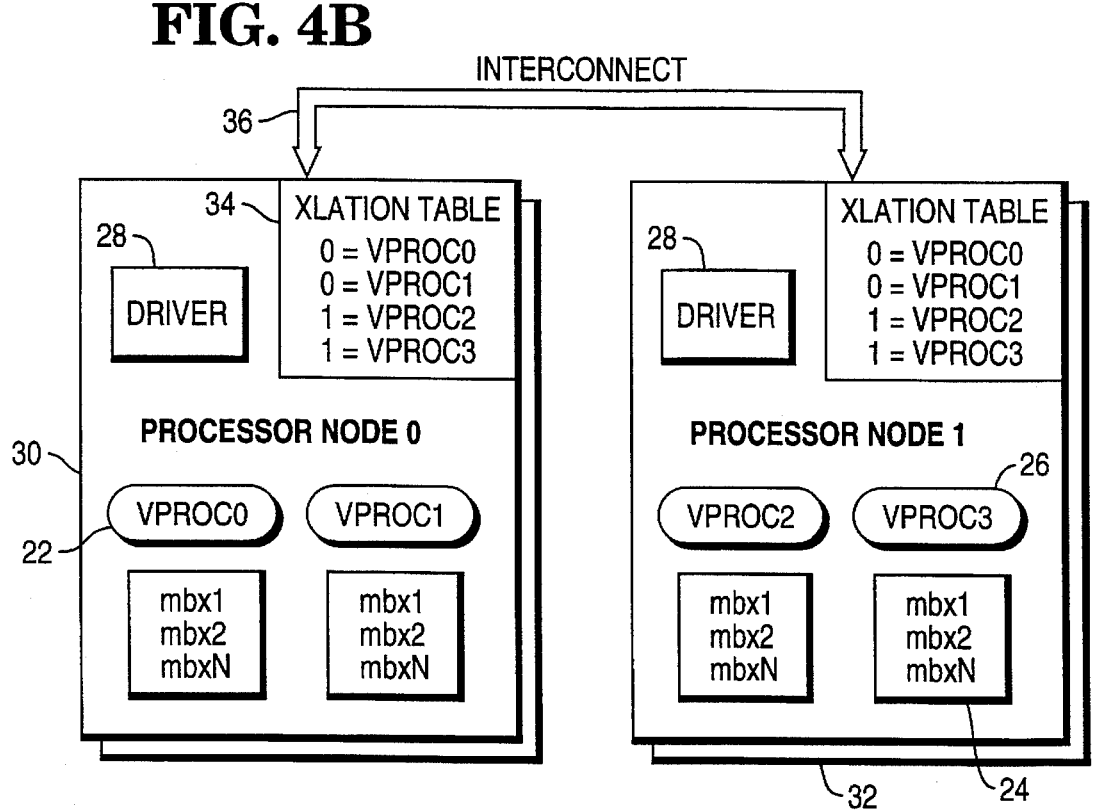

For example, referring to FIG. 4b, a task in vproc0 22 may decide to send a message to mbx1 in mailbox 24 in vproc3 26. The message is prepared and sent to the interconnect driver 28 on the local processor node 30. The driver 28 uses the destination vproc3 26 to look up the hosting processor node in its translation table 34, in the example thus identifying node1 32. The message is sent across the interconnect network 36 to node1 32. The interconnect network driver 28 in node1 32 receives the message and routes it to mbx1 in mailbox 24 in vproc3 26. As a result of the vproc-specific addresses, a task located anywhere in the computer system may send a message to any other task located anywhere in the system. Therefore, referring to FIG. 4a, vprocs 18 on the same node 12 communicate with each other using the same mechanism as vprocs 18 on different nodes 12.

Figure 5:
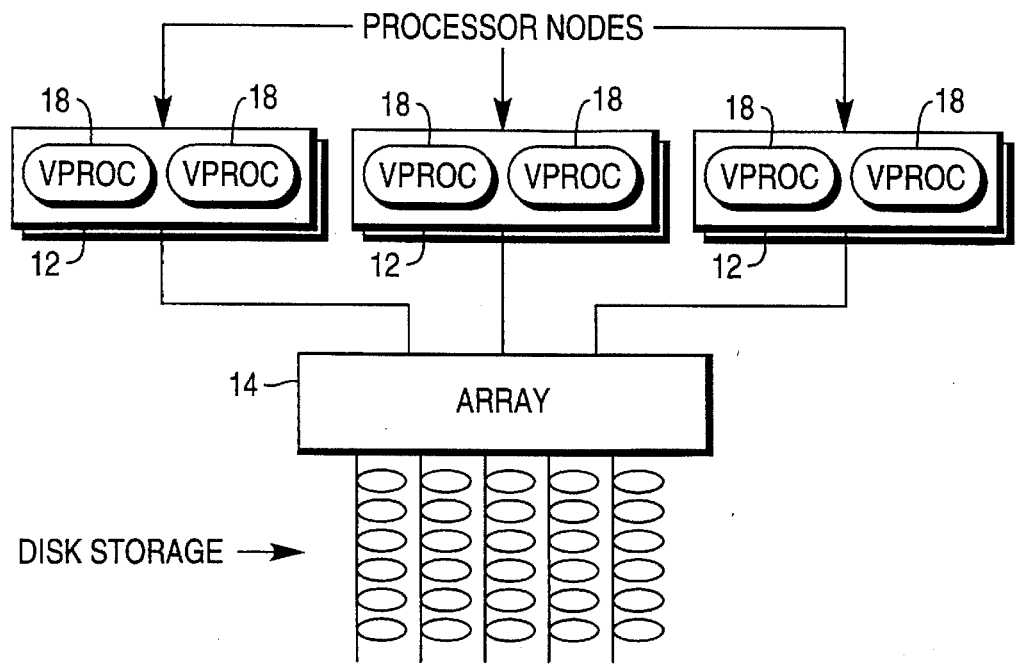
FIG. 5 is a representation of a clique, a collection of processor nodes connected to the same data storage.

FIG. 5 illustrates the concept of a clique in accordance with the present invention. A clique is a collection of processor nodes 12 connected to one or more data storage devices 14. Cliques provide a clustering of processor nodes 12 for increased availability with the side benefit of common shared access to data storage devices 14. Vdisks can be accessed from any processor node 12 within a clique, thereby allowing a vproc 18 to run on any node 12 within the clique. By grouping processor nodes 12 together and attaching them to a common disk storage devices 14, it can be shown that the likelihood of a least one of the processor nodes 12 in the group being functional is orders of magnitude higher than the likelihood of all of the processor nodes in a group being functional. For example, in a three node 12 clique made up of nodes 12 with a 30,000 hr. Mean Time Between Failure (MTBF), the average time between failure of nodes 12 within a clique is 10,000 hr. (30,000 hr./3 nodes per clique). However, given a Mean Time To Repair (MTTR) of 30 hr. for failed nodes 12, the theoretical MTBF of the entire clique then becomes very high (a million time improvement). This is the fundamental benefit of redundancy. Thus, the parallel system is thought of as being composed of an array of cliques, rather than an array of individual processor nodes 12.

Figure 6:
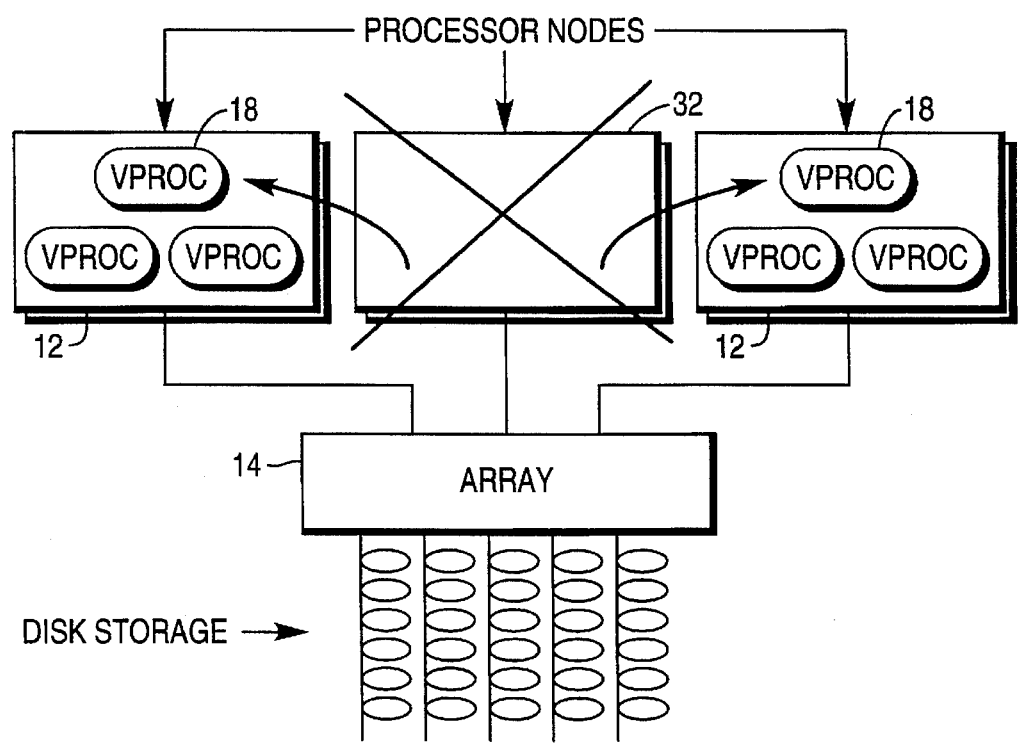
FIG. 6 illustrates that the vproc configuration can be held constant, even though one or more processor nodes are down.

FIG. 6 shows that a configuration can be held constant even though one or more processor nodes 12 has failed or are shut down. Data storage devices 14 have some well-know forms of redundancy and recovery (e.g., mirroring and other RAID algorithms). Configuring processor nodes 12 and data storage/devices 14 into cliques provide the redundant hardware, and vprocs 18 provide the redundant software. By using the traits of multiple threads 16 per processor node 12 and location independence (because a vproc 18 does not know which processor node 12 it is allocated to beforehand), it can be shown that the vproc 18 configuration can be held constant, even though one or more processor nodes 12 are unavailable. All of the data that is being processed is available on the shared data storage devices 14. The resultant configuration may operate with less processing power, but the parallel application still has the same number of vprocs 18 and retains full access to all data storage devices 14.

In summary, the present invention discloses a virtual processor method and apparatus for parallel computer systems that increases the level of parallelism to include multiple threads per node. If a processor node has a plurality of storage devices attached, each individual thread can be allocated to a different data storage device. Similarly, if a processor node has multiple CPUs, each individual thread can utilize a different CPU in the node. Thus, a task could potentially occupy all available hardware in the system. The result is increased system utilization and availability.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A computer system, comprising:
   (a) a plurality of processor nodes, each of the processor nodes having a plurality of data storage devices connected thereto;
   (b) an interconnect network, coupled to the processor nodes, for transmitting messages between processor nodes;
   (c) each of the processor nodes comprising a plurality of vproc means for performing a plurality of threads simultaneously, wherein each vproc means independently performs one of the threads, the threads being streams of instructions executed on behalf of a task, wherein each of the threads access data on a different data storage device simultaneously with the other threads; and
   (d) each of the processor nodes comprising operating system means for assigning the vproc means to processor nodes at system startup, further comprising means for creating and storing a translation table identifying locations of vproc means and processor nodes on the interconnect network at the system startup.

2. A computer system as recited in claim 1, wherein each processor node consists of one central processing unit (CPU).

3. A computer system as recited in claim 1, wherein:
   each processor node has a plurality of central processing units (CPUs); and
   said operating system means assigns the vproc means to processor nodes independent of the number of central processing units (CPUs) contained within each processing node.

4. A computer system as recited in claim 1, further comprising an interconnect network driver for transmitting messages between vproc means, wherein each of the vproc means includes one or more mailboxes, such that when a message is sent to a mailbox at a particular vproc means, the interconnect network driver looks up a vproc means/processor node translation in the translation table and sends the message to a designated processor node and the designated processor node routes it locally to an appropriate mailbox in the particular vproc means.

5. A computer system as recited in claim 1, further comprising a clustering of processor nodes connected to a common set of data storage devices, wherein the processor nodes are cross-connected to the common set of data storage devices.

6. A computer system as recited in claim 5, wherein each vproc means is connected to at least one virtual disk comprising one or more memory regions of the data storage devices that are grouped together, wherein the virtual disk is accessible by any processor node within a clique, thereby allowing the vproc means to be started and executed on any processor node within a clique.

7. A computer system, comprising:
   (a) a plurality of processor nodes, each of the processor nodes having a plurality of data storage devices connected thereto;
   (b) an interconnect network, coupled to the processor nodes, for transmitting messages between processor nodes;
   (c) each of the processor nodes comprising a plurality of vproc means for performing a plurality of threads simultaneously, wherein each vproc means independently executes one of the threads, the threads being streams of instructions executed on behalf of a task, wherein each of the threads access data on a different data storage device simultaneously with the other threads; and
   (d) each of the processor nodes comprising an operating system means for assigning the vproc means to processor nodes at system startup, for creating and storing a translation table identifying locations of vproc means and processor nodes on the interconnect network at startup time, and for providing updates to the translation table when movement of the vproc means between processor nodes occurs during runtime.

8. A computer system as recited in claim 7, wherein each processor node consists of one central processing unit (CPU).

9. A computer system as recited in claim 7, wherein:
   each processor node has a plurality of central processing units (CPUs); and
   said operating system means assigns the vproc means to processor nodes independent of the number of central processing units (CPUs) contained within each processing node.

10. A computer system as recited in claim 7, further comprising an interconnect network driver for transmitting messages between vproc means, wherein each vproc means includes one or more mailboxes, such that when a message is sent to a mailbox at a particular vproc means, the interconnect network driver looks up a vproc means/processor node translation in the translation table and sends the message to a designated processor node and the designated processor node routes it locally to an appropriate mailbox in the particular vproc means.

11. A computer system as recited in claim 7, further comprising a clustering of processor nodes connected to a common set of data storage devices, wherein the processor nodes are cross-connected to the common set of data storage devices.

12. A computer system as recited in claim 11, wherein each vproc means is connected to at least one virtual disk comprising one or more memory regions of the data storage devices that are grouped together, wherein the virtual disk is accessible by any processor node within a clique, thereby allowing the vproc means to be started and executed on any processor node within a clique.

13. A method of communicating between a plurality of threads executing in a parallel computer system comprising a plurality of processor nodes after a processor node failure, the method comprising the steps of:
   (a) utilizing a plurality of vprocs to perform multiple threads simultaneously, wherein each vproc comprises an operating environment in one of the processor nodes for performing one of said multiple threads, each one of said multiple threads being a stream of instructions executed on behalf of a task, wherein each one of said multiple threads access data on a different data storage device simultaneously with the rest of said multiple threads;

(b) moving a vproc from a first processor node to a second processor node after the first processor node has failed;

(c) updating a vproc/processor node translation table to reflect the movement of the vproc from the first processor node to the second processor node, so that any messages are routed to the vproc in the second processor node;

(d) storing information from the vproc on a virtual disk comprised one or more memory regions of the data storage devices that are grouped together, wherein the virtual disk is accessible by any processor node within a clique;

(e) moving the vproc to a processor node in the clique; and (f) restarting a thread performed by the moved vproc using information retrieved from the virtual disk.

14. A method as recited in claim 13, comprising the steps of:

(1) adding an available processor node to said parallel computer system; and (2) selectively moving vprocs from other processor nodes to the available processor node until the vprocs are optimally distributed between the processor nodes.

15. A method of executing instructions in a parallel computer system comprised of a plurality of processor nodes, each of the processor nodes having a plurality of data storage devices connected thereto, and an interconnect network, coupled to the processor nodes, for transmitting messages between processor nodes, the method comprising:

(a) utilizing a plurality of vprocs to perform multiple threads simultaneously, wherein each vproc comprises an operating environment in one of the processor nodes for performing one of said multiple threads, each one of said multiple threads being a stream of instructions executed on behalf of a task, wherein each one of said multiple threads access data on a different data storage device simultaneously with the rest of said multiple threads; and (b) assigning each of the vprocs to one of the processor nodes at system startup, further comprising creating and storing a translation table identifying locations of vprocs and processor nodes on the interconnect network at the system startup.

16. A method as recited in claim 15, further comprising the step of transmitting messages between vprocs, wherein each of the vprocs includes one or more mailboxes, such that when a message is sent to a mailbox at a particular vproc means, an interconnect network driver looks up a vproc/ processor node translation in the translation table and sends the message to a designated processor node and the designated processor node routes it locally to an appropriate mailbox in the particular vproc means.

17. A method as recited in claim 15, further comprising the step of clustering processor nodes into a clique connected to a common set of data storage devices, wherein the processor nodes are cross-connected to the common set of data storage devices.

18. A method as recited in claim 17, wherein each vproc is connected to at least one virtual disk comprising one or more memory regions of the data storage devices that are grouped together, and the virtual disk can be accessed by a processor node within a clique, thereby allowing the vproc to be started and executed on any processor node within a clique.

19. A method of executing instructions in a parallel computer system comprised of a plurality of processor nodes, each of the processor nodes having a plurality of data storage devices connected thereto, and an interconnect network, coupled to the processor nodes, for transmitting messages between processor nodes, the method comprising:

(a) utilizing a plurality of vprocs to perform multiple threads simultaneously, wherein each vproc comprises an operating environment in one of the processor nodes for performing one of said multiple threads, each one of said multiple threads being a stream of instructions executed on behalf of a task, wherein each one of said multiple threads access data on a different data storage device simultaneously with the rest of said multiple threads; and (b) assigning the vprocs to processor nodes at system startup, including the steps of creating and storing a translation table identifying locations of vprocs and processor nodes on the interconnect network at system startup, and providing updates to the translation table when movement of the vprocs between processor nodes occur during runtime.

20. A method as recited in claim 19, further comprising the step of transmitting messages between vprocs, wherein each vproc includes one or more mailboxes, such that when a message is sent to a mailbox at a particular vproc, an interconnect network driver looks up a vproc/processor node translation in the translation table and sends the message to a designated processor node and the designated processor node routes it locally to an appropriate mailbox in the particular vproc.

21. A method as recited in claim 19, further comprising the step of clustering processor nodes in a clique connected to a common set of data storage devices, wherein the processor nodes are cross-connected to the common set of data storage devices.

22. A method as recited in claim 21, wherein each vproc is connected to at least one virtual disk comprising one or more memory regions of the data storage devices that are grouped together, wherein the virtual disk is accessible by any by a processor node within a clique, thereby allowing the vproc means to be started and executed on any processor node within a clique.

* * * * *